Nov. 26, 1940.  E. BECKER ET AL  2,223,054
WELDING TRANSFORMER
Filed Feb. 14, 1939

INVENTORS.
Emil Becker and
John Edward Becker
BY George Pickes
ATTORNEY.

Patented Nov. 26, 1940

2,223,054

UNITED STATES PATENT OFFICE 2,223,054

WELDING TRANSFORMER

Emil Becker, Munich, Germany, and John Edward Becker, Stoney Creek, Ontario, Canada Application February 14, 1939, Serial No. 256,298
In Germany February 21, 1938

2 Claims. (Cl. 219—4)

Our invention relates to improvements in welding transformers and the object of the invention is to produce a comparatively light manually movable welding apparatus which is self-contained and so constructed that it can be employed to fit within comparatively small hollow structures wherein the welding is accomplished from the inside of the structure, the complete welding apparatus being moved from welding-point to welding-point along the inside of the structure.

A further object of our invention is to construct our transformer particularly for two-point welding and to furnish manually operable means for elevating or lowering the welding electrodes into and out of contact with the work being welded, the electrode moving rod or handle being designed to extend rearwardly of the transformer a substantial distance so that while the transformer may be pushed a considerable distance into a cellular structure, the electrode moving handle has its end protruding outside of the cellular structure whereby the transformer can be adjusted in place and the electrodes readily manipulated by the operator.

A still further and very particular object of our invention is to design the core of the transformer so that it is comparatively narrow in height as compared with standard equipment and to wind the primary winding upon one portion of the core and the secondary winding upon another portion of the core so that the windings do not overlap. In this way the height of the transformer is kept at a minimum.

Our welding transformer is preferably carried upon a plurality of rollers distributed along its bottom face so that the transformer can be readily rolled into the inside of and along the cells of cellular structures, the transformer being guided in its movement by the elongated electrode actuating handle which is designed of sufficient length to protrude outwardly from any average structure being welded.

For an understanding of the invention and the manner in which the same is constructed and operated, reference is to be had to the following description and the accompanying drawing, in which.

Like characters of reference refer to like parts throughout the specification and drawing.

Figure 3:
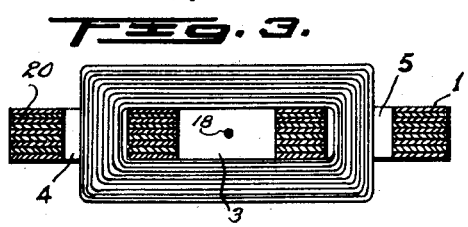
Figure 3 is a cross-sectional view on the line 3—3, Figure 2.

Our transformer broadly comprises a magnetic core 1 which follows standard practice in being constructed of laminated form, as indicated by the laminae 20 in Figure 3. The laminated core 1 is of rectangular form and of a comparatively small height in relation to its length and breadth, as will be apparent from the drawing, and is formed with three longitudinal slots 3, 4 and 5 which pass downwardly through the core and extend from the vicinity of one end of the core to the other.

Figure 1:
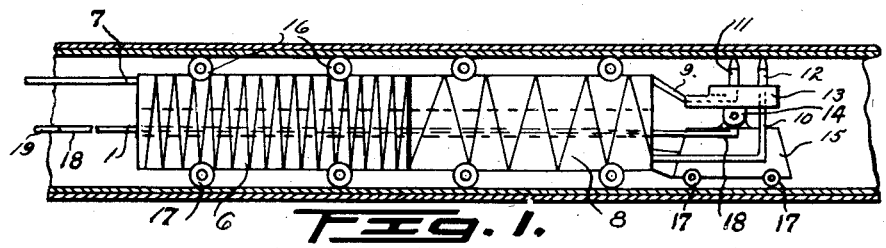
Figure 1 is a cross-sectional view through a transformer constructed in accordance with this invention and a hollow cellular structure which is being welded from the inside.
Figure 2:
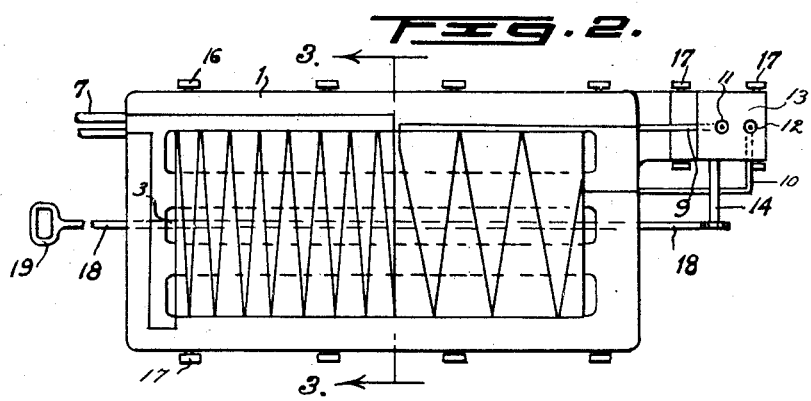
Figure 2 is a plan view of the transformer constructed in accordance with this invention.

The core 1 carries the primary and secondary windings 6 and 8 which pass through the slots 4 and 5 around the central portion of the core, as illustrated in Figures 2 and 3. The windings 6 and 8 are positioned upon the core 1 so that they do not overlap, that is, the primary winding 6 is wound upon one end portion of the core and the winding 8 wound around the other end portion of the core. In this way the height of the transformer is kept at a minimum. The windings 6 and 8 are, of course, distinct from one another following standard practice and the primary winding 6 is connected by a cable 7 to a source of electric power. The secondary winding 8 is furnished with short secondary cables 9 and 10 connecting the secondary winding to the welding electrodes 11 and 12.

The welding electrodes 11 and 12 are suitably mounted upon an adjustable frame 13 which is in turn carried upon a truck element 15 secured to the forward end of the transformer unit. The transformer and the truck 15 are furnished with a plurality of supporting rollers 17 whereby the assembly can be conveniently wheeled into a structure to be welded. If it is desirable, the upper face of the transformer assembly can be furnished with a plurality of rollers 16 which are provided to engage the top of a structure into which the transformer may be inserted. The frame 13 is adjustably mounted upon the truck 15 through the provision of a suitable eccentric mechanism 14. The rotation of the eccentric mechanism 14 causes the electrode supporting frame 13 to be raised or lowered so as to bring the electrodes into and out of contact with the structure being welded.

The eccentric mechanism 14 can be of any simple and suitable design and it is preferably actuated by a long handle spindle 18 having a handle 19 upon its outer end, the spindle being connected at the other end to the eccentric mechanism 14 and upon twisting of the handle, movement of the frame 13 and electrodes is achieved. The handle spindle 18 is preferably made of sufficient length so that its handle 19 will protrude outside of any normal sized structure into which our transformer is being inserted. The handle spindle 18 has a dual function in that the operator can move the transformer into place in the structure by pulling or pushing on the handle spindle 18, and upon twisting the handle 19, the electrodes 11 and 12 are brought into and out of contact with the structure being welded. The spindle 18 extends through the central cell 3 in the core 1 and also through the end portions of the core at the ends of the cell 3, as illustrated in dotted lines in Figure 2.

From the foregoing description it will be seen that we have devised a welding transformer which is of a relatively small height and therefore particularly adapted for use in insertion into small cellular structures, and that adjustment of the transformer within the structure and also movement of the electrodes can be readily effected by actuation of the handle 19. It will also be apparent that by winding the elongated core of the transformer with the primary and secondary windings positioned side by side, that a construction particularly adapted for its purpose has been attained.

What we claim as our invention is:

1. A welding transformer incorporating a horizontally positioned elongated bar core having a pair of vertical slots extending through its top and bottom faces, a primary winding wound through the slots and around one end portion of the core and connected to a source of electrical current, a secondary winding wound through the slots and around the other end portion of the core, the primary and secondary windings being positioned side by side, a pair of welding electrodes adjustably positioned at one end of the core and connected to the secondary winding, rollers upon which the transformer is mounted, and means extending from the transformer for actuating the electrodes independently of movement of the transformer.

2. A welding transformer incorporating a horizontally positioned elongated bar core having a pair of vertical slots extending through its top and bottom faces, a primary winding wound through the slots and around one end portion of the core and connected to a source of electrical current, a secondary winding wound through the slots and around the other end portion of the core, the primary and secondary windings being positioned side by side, a pair of welding electrodes adjustably positioned at one end of the core and connected to the secondary winding, rollers upon which the transformer is mounted, and a manually twistable spindle extending from the transformer to constitute a guiding handle for wheeling the transformer and also for actuating the electrodes independently of movement of the transformer.

EMIL BECKER.
JOHN EDWARD BECKER.